United States Patent [19]

Yamada

[11] Patent Number: 4,713,741
[45] Date of Patent: Dec. 15, 1987

[54] EXCITATION CONTROL APPARATUS FOR ROTARY ELECTRIC MACHINE

[75] Inventor: Tutomu Yamada, Kobe, Japan

[73] Assignee: Mitsubishi Denki Kabushiki Kaisha, Japan

[21] Appl. No.: 883,508

[22] Filed: Jul. 8, 1986

[30] Foreign Application Priority Data

Jul. 9, 1985 [JP] Japan ................. 60-151892

[51] Int. Cl.$^4$ .......................... H02H 7/00; H02P 9/00
[52] U.S. Cl. ......................................... 363/50; 363/54; 363/65; 363/69; 307/82; 307/87; 322/22; 322/28; 324/158 MG
[58] Field of Search ................. 363/50, 54, 58, 65, 363/69, 70; 322/22–25, 28, 99; 307/82, 84, 87; 324/158 MG

[56] References Cited

U.S. PATENT DOCUMENTS

| 4,245,182 | 1/1981 | Aotsu et al. | 322/24 X |
| 4,326,159 | 4/1982 | Aotsu et al. | 322/22 X |
| 4,410,848 | 10/1983 | Frierdich | 322/25 |
| 4,438,385 | 3/1984 | Sato et al. | 322/23 X |

FOREIGN PATENT DOCUMENTS 51-34084 9/1976 Japan.
51-49046 12/1976 Japan.

Primary Examiner—Peter S. Wong
Assistant Examiner—Emanuel Todd Voeltz
Attorney, Agent, or Firm—Leydig, Voit & Mayer

[57] ABSTRACT

An excitation control apparatus for a rotary electric machine according to this invention is such that principal portions of an automatic voltage regulator are dualized by effectively combining circuits preferring decrease of a field current and circuits preferring increase of the field current, thereby to enhance the reliability of the apparatus. The circuits preferring the decrease of the field current when the ignition phase of a thyristor circuit advances precede the circuits preferring the increase of the field current, so that an excitation system is normally operated even in cases of the damages or abnormalities of any internal component, etc.

2 Claims, 5 Drawing Figures

EXCITATION CONTROL APPARATUS FOR ROTARY ELECTRIC MACHINE

BACKGROUND OF THE INVENTION

This invention relates to enhancement in the reliability of an automatic voltage regulator apparatus which controls the output voltage of a generator to a prescribed value.

FIG. 5 shows the arrangement of the automatic voltage regulator apparatus (hereinbelow, expressed as 'AVR') in a prior art system for controlling field excitation for a rotary electric machine such as a generator to obtain a constant output voltage. Referring to FIG. 5, numeral 1 designates an AC generator which has a field coil 2. A diode 3 rectifies the output of an AC exciter (hereinbelow, expressed as 'AC-EXC') 4 which has a field coil 5. Numerals 6 and 7 designate potential transformers (hereinbelow, expressed as 'PTs'). A voltage setting unit 8 (hereinbelow, termed 'unit 90R') makes use of an inductive voltage regulator, and a regulating motor 9 (hereinbelow, termed 'motor 90RM') drives the unit 90R. Diodes 10-15 constitute a three-phase full-wave rectifier circuit, a capacitor 16, and a choke coil 17 smooths ripple. Shown at numeral 18 is a variable resistor. An operational amplifier 25 has input resistors 21-23 and a feedback resistor 24. Numeral 26 indicates a field follow-up device. A motor (hereinafter, expressed as '70EM') 27 serves to drive a manual voltage setting unit (hereinafter, expressed as '70') 28 which makes use of an inductive voltage regulator. Shown at numeral 29 is an AC←DC inverter circuit. A contact 30 is closed when the AVR is automatic, while a contact 31 is opened when the AVR is automatic and closed when the AVR is manual. An operational amplifier 35 has input resistors 32 and 33 and a feedback resistor 34. Numeral 36 indicates a balance meter. The AVR further comprises ignition circuits 41 and 42, thyristors 43-54, circuit breakers 55 and 56, and a magnet generator 57. It also comprises a shunt 61, an amplifier 62, a resistor 63, capacitors 64 and 65, and a variable resistor 66. Also comprised is an operational amplifier 69 which has resistors 67 and 68.

Next, the operation of the prior-art AVR will be explained.

When the AVR is to be started, the contact 30 is opened, and the unit 70E (28) is set at a no-load prescribed voltage, the signal of which is provided. Outputs proportional to the signal are delivered from the two thyristor circuits 43-48 and 49-54, and are used to excite the AC-EXC 4. Using an output from the AC-EXC 4, the generator 1 is excited.

In case of putting the AVR into the automatic mode, the unit 90R (8) is regulated to acknowledge it with the balance meter 36 that the output of the operational amplifier 25 being an AVR signal is null, and the contact 30 is thereafter closed.

The output voltage of the generator 1 is stepped down to 110 V by the PT 6 and the PT 7, and is further regulated by the unit 90R (8). The resulting voltage is rectified by the three-phase full-wave rectifier circuit 10-15, and the rectified voltage is smoothed into a plus voltage. On the other hand, a voltage —E regulated to a minus fixed value is applied as the reference voltage of the operational amplifier 25. When the output voltage of the generator 1 is a prescribed voltage, the difference of the aforementioned two input voltages of the amplifier 25 is null, and hence, the output of the amplifier 25 becomes null. The field current of the AC-EXC 4 is detected by the shunt 61, and is amplified by the amplifier 62. The amplified voltage is applied across a series circuit consisting of the resistor 63 and the capacitor 64, and is differentiated by a circuit consisting of the capacitor 65 and the variable resistor 66. Thus, the operational amplifier 25 is supplied with a signal which is negatively fed back to the generator 1 and which prevents hunting from developing in the generator 1. The operational amplifier 69 is an amplifier for polarity inversion.

The field follow-up device 26 operates as follows: The output value of the unit 70E (28) is regulated beforehand so as to ensure the magnitude of the basic part of an excitation current, whereby even when the contact 30 is opened on account of the fault of the AVR attributed to any abnormality, the output voltage of the generator 1 is prevented from fluctuating greatly. To this end, the output of the operational amplifier 25 whose output corresponds to the deviation of the plurality of inputs is normally monitored with the balance meter 36, and the field follow-up device 26 causes the unit 70E (28) to follow up the output voltage of the generator 1 so that the output of the amplifier 25 may become null. Of course, the device 26 has some operational dead zone and does not effect the follow-up within the dead zone. Moreover, even when the dead zone has been exceeded, the motor 70EM (27) does not drive the unit 70E (28) without the lapse of a certain fixed time interval since then. In this manner, the unit 70E (28) is endowed with the characteristic according to which it follows up the output voltage of the generator 1 with the delay of the fixed time interval.

When the output voltage of the generator 1 changes fast, the operational amplifier 25 produces an output transiently, and the sum of this output with the output of the unit 70E (28) is used to control the field current. Thus, the generator voltage is controlled so as to hold a fixed value.

Each of the two thyristor circuits 43-48 and 49-54 has a capacity enough to excite the field coil 5 of the AC-EXC 4. The dualized arrangement of the two thyristor circuits ensures the operation of the system even when either circuit has failed to ignite, and the outputs of these thyristor circuits are connected by the circuit breakers 55 and 56. In the case where either thyristor circuit has gone wrong, it can be repaired by opening the breaker on its side.

Now, when the generator voltage has risen, the plus voltage obtained by the three-phase full-wave rectification becomes greater in the absolute value than the minus reference voltage, and a lowering signal is provided from the amplifier 25. This signal retards the ignition phases of the ignition devices 41 and 42, to decrease the outputs of the thyristor circuits 43-48 and 49-54 and to decrease the field current of the coil 5. Thus, the output voltage of the generator 1 is controlled so as to become the prescribed value.

Conversely, when the generator voltage has fallen, the minus input of the amplifier 25 becomes greater to generate a raising signal therefrom, and the output of the amplifier 35 increases. Then, the ignition phases of the ignition devices 41 and 42 advances to increase currents from the thyristor circuits and to increase the excitation current. Thus, the output voltage of the generator 1 is corrected to the prescribed value.

In addition, the voltage setting of the unit 90R (8) is performed by changing the proportion between the input voltage and output voltage thereof. More specifically, when the proportion of input voltage to output voltage is increased, the generator voltage must be increased in order to keep constant the plus DC voltage produced by the threephase full-wave rectification. This is equivalent to having set the generator voltage to be greater. On the other hand, the decrease of the proportion is equivalent to setting a smaller generator voltage.

The prior-art AVR described above has the disadvantage that, when either of the two thyristor circuits has broken down in the direction of advancing the ignition phase, the output voltage of this thyristor circuit increases to abruptly raise the output voltage of the generator, so the generator voltage might become an overvoltage. Another disadvantage is that, in such a case, the generator must be shut down during the period that the broken down thyristors are being repaired.

SUMMARY OF THE INVENTION

This invention has been made in order to eliminate the disadvantages of the prior art as stated above, and has for its object to provide an excitation apparatus in which a circuit that preferentially increases the field current of a generator if the ignition phase of a thyristor circuit advances is combined with a circuit that preferentially decreases the field current of the generator and that precedes the field current increase preferring circuit, whereby even when a thyristor has undergone a fault, a fault signal can be removed to hold a generator voltage at a prescribed value. With the excitation apparatus, even when any component thereof has become defective, the normal output can be secured as a whole system.

DESCRIPTION OF THE PREFERRED EMBODIMENTS

Figure 1:
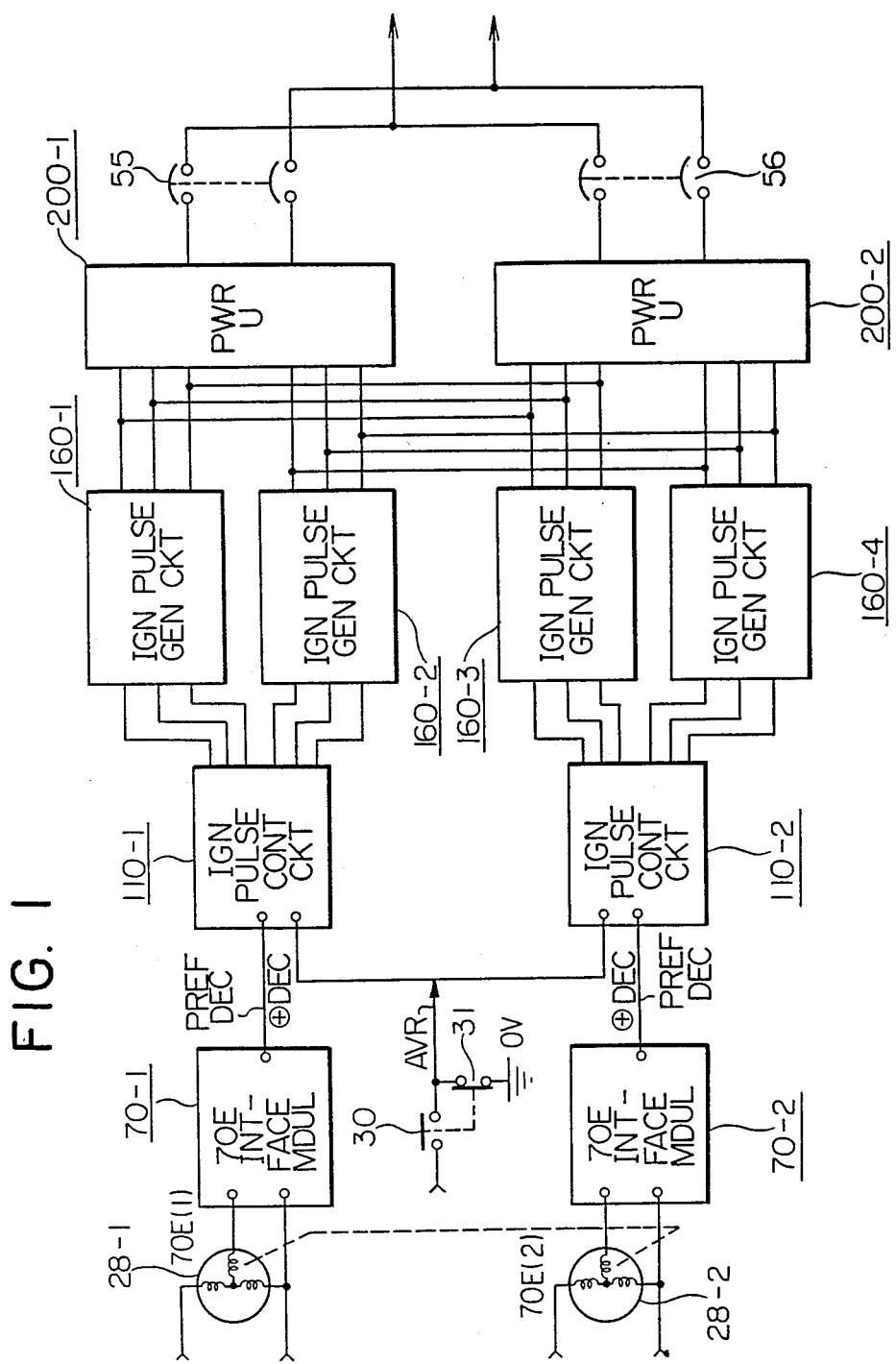
FIG. 1 is a circuit diagram showing an embodiment of this invention.
Figure 2:
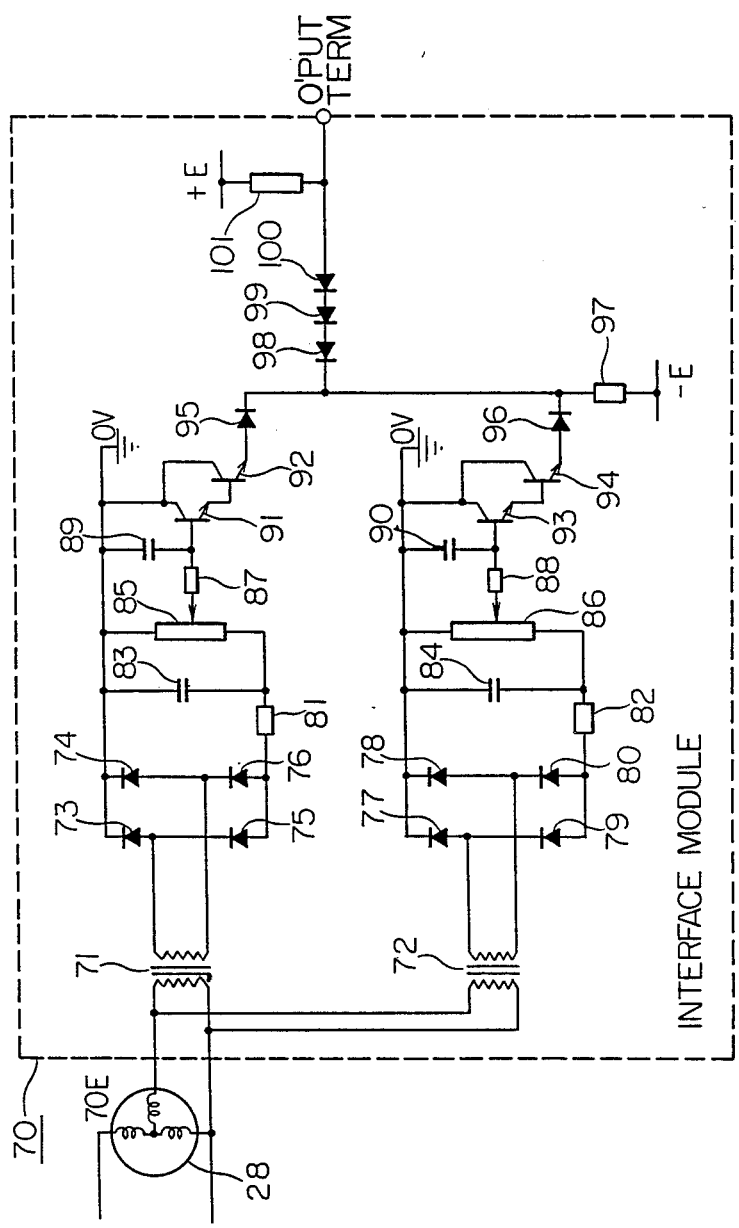
FIG. 2 is a circuit diagram showing an embodiment of the arrangement of an interface module in this invention.
Figure 3:
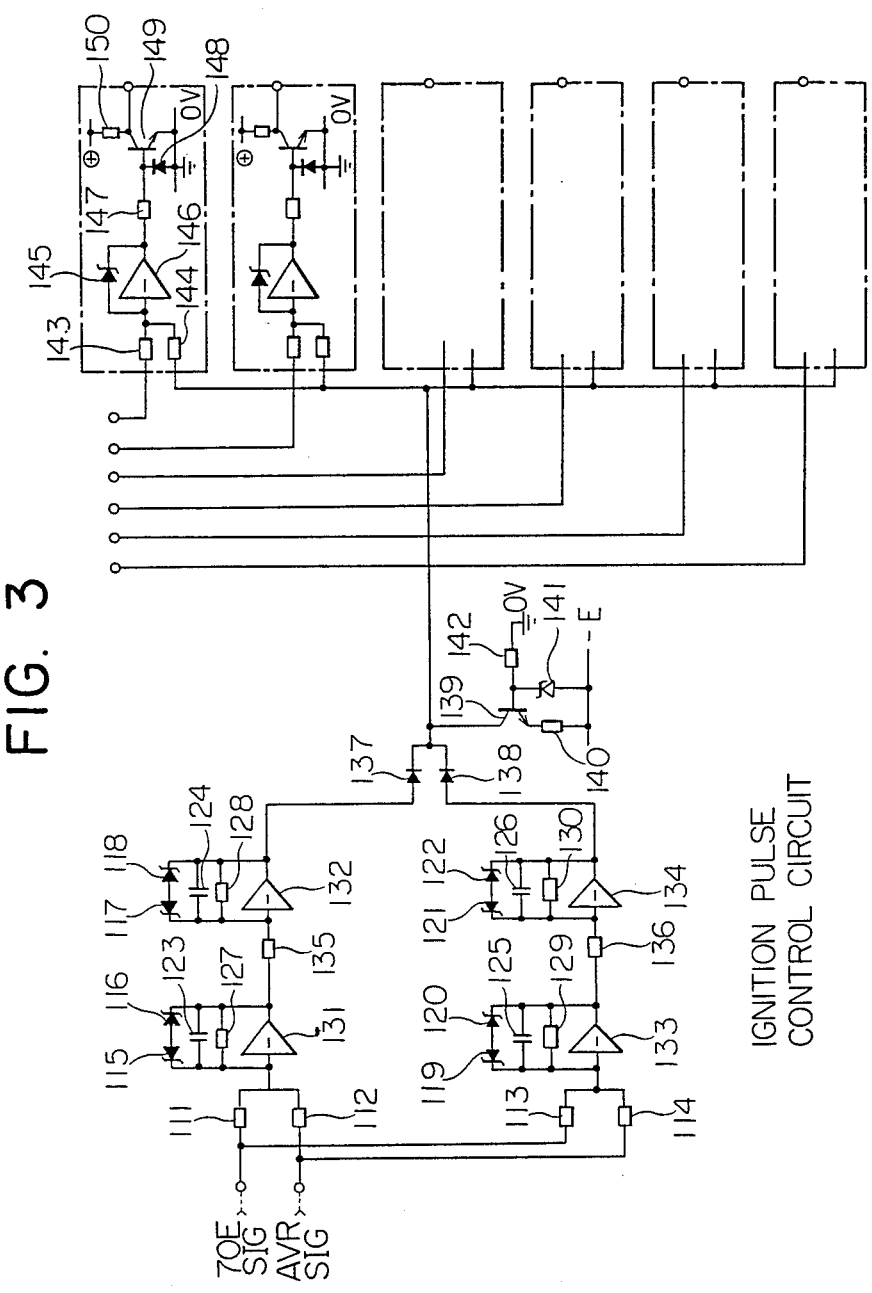
FIG. 3 is a circuit diagram showing an embodiment of the arrangement of an ignition pulse control circuit in this invention.
Figure 4:
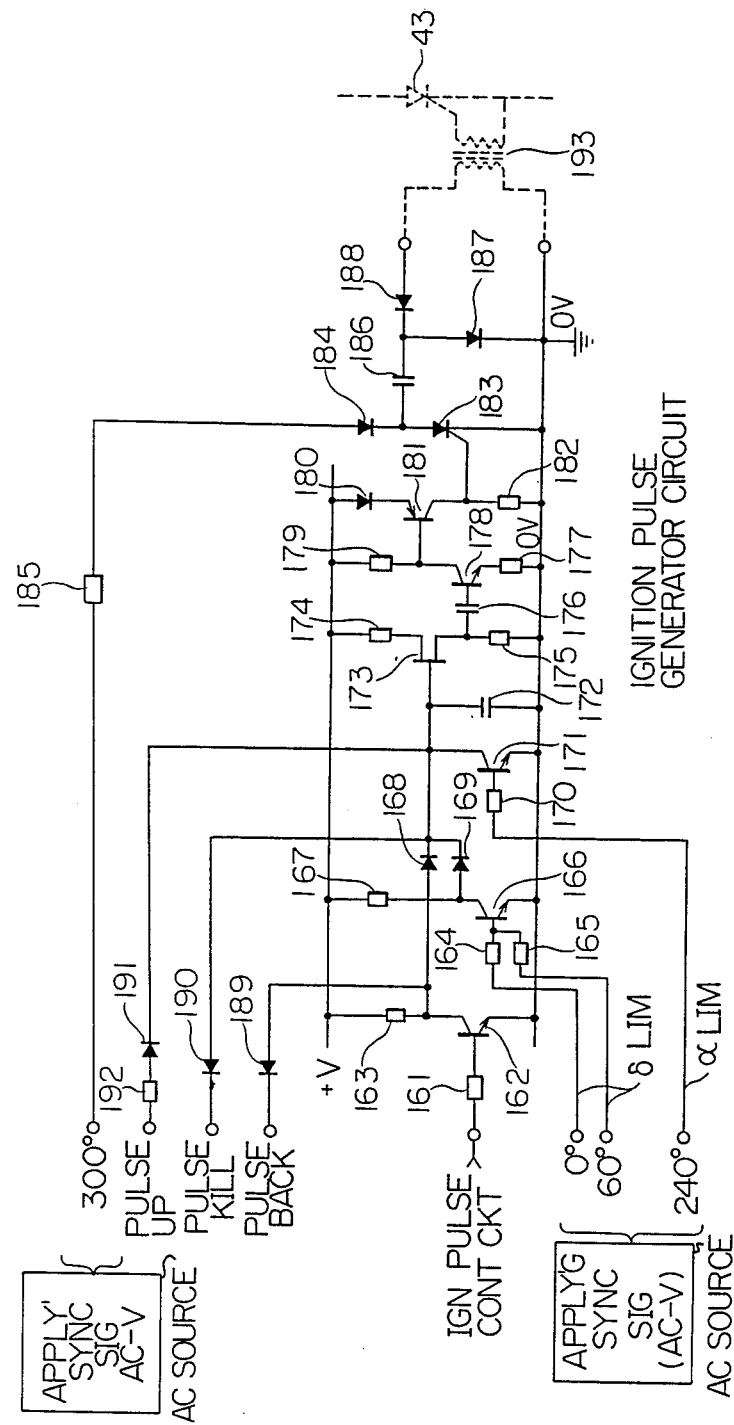
FIG. 4 is a circuit diagram showing an embodiment of the arrangement of an ignition pulse generator circuit in this invention.
Figure 5:
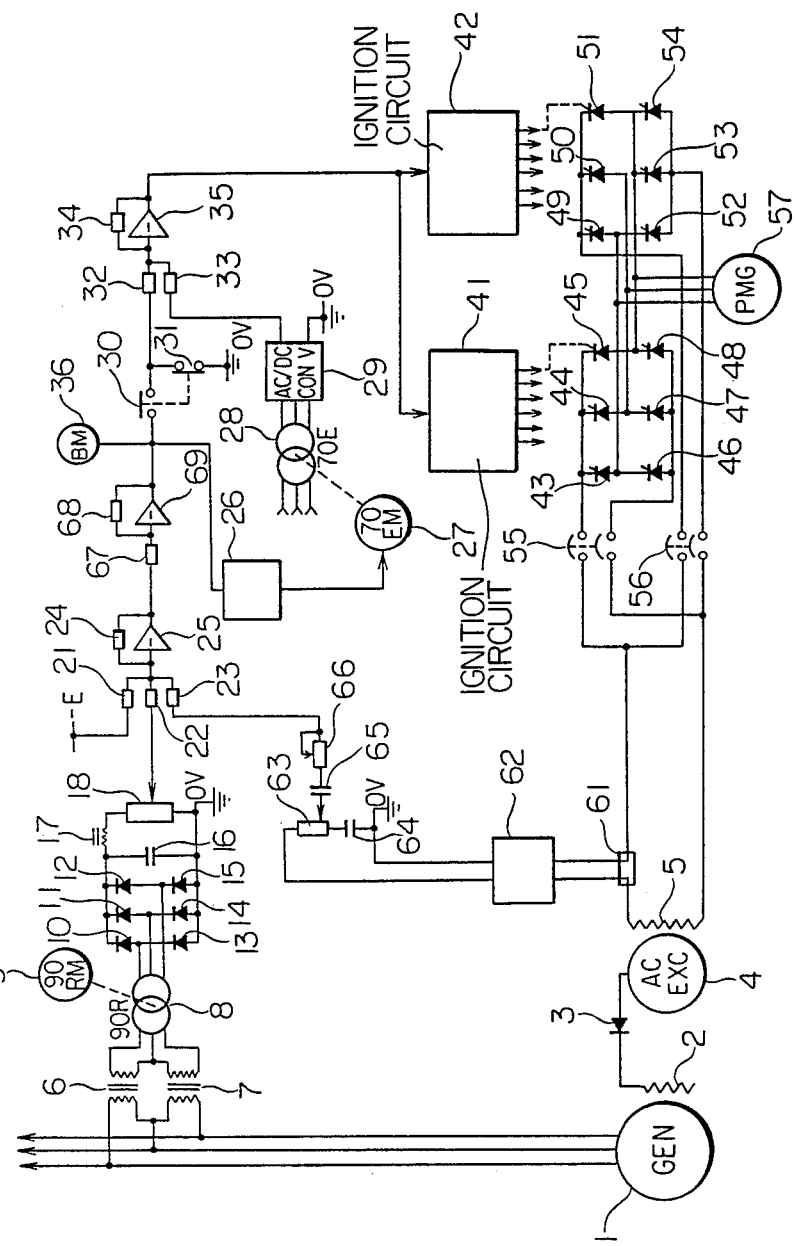
FIG. 5 is a circuit diagram for explaining an excitation apparatus in a prior art.

Now, embodiments of this invention will be described with reference to the drawings. In FIG. 1, symbols 28-1 and 28-2 denote manual voltage setting units as which two inductive voltage regulators are interlocked. Symbols 70-1 and 70-2 denote 70E interface modules each of which has an internal arrangement as shown in FIG. 2, and the two interface modules of the same characteristics are prepared. Symbols 110-1 and 110-2 indicate ignition pulse control circuits each of which has an internal arrangement as shown in FIG. 3, and the two control circuits of the same arrangements are prepared. Shown at 160-1, 160-2, 160-3 and 160-4 are ignition pulse generator circuits. The internal arrangement of each of these generator circuits corresponding to one phase is as shown in FIG. 4, and such arrangements for this phases construct the single circuit unit 160-1, 160-2, 160-3 or 160-4. Thus, the four units of the same circuit arrangements are prepared. Symbols 200-1 and 200-2 indicate power units in which thyristors are assembled into three-phase bridges likewise to those 43–48 and 49–54 in FIG. 5 respectively and which are respectively furnished with circuit breakers 55 and 56 as in the prior art.

Referring to FIG. 2, each of the 70E interface modules 70-1 and 70-2 comprises transformers 71 and 72, diodes 73 - 80 for full-wave rectification, resistors 81 and 82, capacitors 83 and 84, variable resistors 85 and 86, resistors 87 and 88, capacitors 89 and 90, transistors 91–94, diodes 95 and 96, a resistor 97, diodes 98–100, and a resistor 101.

Referring to FIG. 3, each of the ignition pulse control circuits 110-1 and 110-2 in FIG. 1 comprises resistors 111 - 114, Zener diodes 115–122, capacitors 123–126, resistors 127–130, operational amplifiers 131–134, resistors 135 and 136, diodes 137 and 138, a transistor 139, a resistor 140, a Zener diode 141, a resistor 142, resistors 143 and 144, a Zener diode 145, an operational amplifier 146, a resistor 147, a diode 148, a transistor 149, and a resistor 150.

Referring to FIG. 4, each of the same three circuit arrangements included in the ignition pulse generator circuit 160-1, 160-2, 160-3 or 160-4 in FIG. 1 comprises a resistor 161, a transistor 162, a resistor 163, resistors 164 and 165, a transistor 166, a resistor 167, diodes 168 and 169, a resistor 170, a transistor 171, a capacitor 172, a unijunction transistor 173, resistors 174 and 175, a capacitor 176, a resistor 177, a transistor 178, a resistor 179, a diode 180, a transistor 181, a resistor 182, a thyristor 183, a diode 184, a resistor 185, a capacitor 186, diodes 187 and 188, diodes 189 - 191, a resistor 192, and a pulse transformer 193.

Next, the operation of the embodiment of the excitation control apparatus will be described. This embodiment illustrates a case where the circuits at stages succeeding the manual voltage setting units 70E, including the power units, are dualized. In the arrangement of FIG. 1, the two setting units 70E (28) are shown, and also the two 70E interface modules 70-1 and 70-2 are shown. The interior of each 70E interface module is as shown in FIG. 2. The output of the setting unit 70E is subjected to full-wave rectification and is filtered, whereupon the resulting voltage is amplified by Darlington-connected transistors. Two such circuits of identical arrangement are prepared, and a higher one of the two amplified voltages is delivered to an output terminal owing to the diodes 95 and 96. That is, in a case where the disconnection of any resistor or the trouble of any transistor has arisen in one of the two circuits, the circuit having the trouble affords a potential close to zero volts (the higher voltage), which becomes a field current decrease preferring signal.

The internal arrangement of each of the ignition pulse control circuits 110-1 and 110-2 is shown in FIG. 3. The signal of the 70E interface module 70-1 or 70-2 and an AVR signal are received, the sum of the two signals is found, and the sign of the sum is changed. Two circuits each having such functions are juxtaposed, and each control circuit 110-1 or 110-2 forms a high voltage signal preferring circuit in which a higher one of voltages from the two circuits is delivered owing to the diodes 137 and 183. Since the higher voltage side becomes a signal in the direction of decreasing the field current of a generator, also the ignition pulse control circuit 110-1 or 110-2 provides a field current decrease preferring signal.

The internal arrangement of one phase of each of the ignition pulse generator circuits 160-1 - 160-4 is shown in FIG. 4. In operation, when the thyristor 183 has ignited, charges which have been stored in the capacitor 186 through the resistor 185, the diode 184, this capacitor 186, the diode 187 and 0 V by an AC power source are discharged through the thyristor 183, the diode 188 and the pulse transformer 193 to generate a pulse on the secondary side of the pulse transformer. The control of the gate signal of the thyristor 183 as stated above permits the phase control of the gate pulse which appears on the secondary side of the pulse transformer 193.

As signals necessary for the pulse control, AC voltages having predetermined phases are supplied from a sync signal module (not shown). The transistor 162 turns "on" when the base thereof has a plus potential with respect to the emitter thereof. When the transistor 162 is "on", the collector potential thereof is substantially 0 V. Therefore, the unijunction transistor 173 does not turn "on", the transistor 178 is cut off, the transistor 181 is also cut off, and no current flows through the resistor 182. Consequently, the gate voltage of the thyristor 183 is substantially 0 V, and this thyristor 183 does not turn "on".

When the transistor 162 is "off", the collector voltage thereof becomes plus, and current flows through the resistor 163, the diode 168 and the capacitor 172. Thus, this capacitor 172 is charged, and the terminal voltage thereof rises.

With a delay of about 10° after the transistor 162 has turned "off", the unijunction transistor 173 turns "on", and the gate of the thyristor 183 becomes plus, so that this thyristor 183 turns "on" to generate a pulse. That is, the pulse is generated with the delay of about 10° after the signal applied from the ignition pulse control circuit 110-1 or 110-2 to the transistor 162 has changed from plus to minus.

The AC voltage having a delay of 240° is applied from the sync signal module (not shown) to the transistor 171. When the transistor 171 is thus turned "on", the unijunction transistor 173 ceases to oscillate, and the ignition pulse is no longer generated. That is, the thyristor ignites in a range of 0°-180°, and the transistor 171 is disposed in order to prevent the ignition phase from advancing in excess of a predetermined value even when a signal outside the range has arrived (this transistor is called "$\alpha$ limiter"). Owing to the delay of 10°, the ignition angle is limited to 10°-180°.

The AC voltages with delays of 0° and 60° are applied from the sync signal module (not shown) to the transistor 166, and the two signals are added to form a signal with a phase delay of 30°. This circuit is a limiter which copes with a case where the ignition pulse delays excessively (this limiter is called "$\gamma$ limiter"). After the transistor 166 has turned from "on" into "off", an ignition pulse is generated. Since a delay of 10° is involved as in the $\alpha$ limiter, the ignition angle does not delay beyond 160°.

After all, the ignition angle is limited within 10°-160° owing to the $\alpha$ limiter and the $\gamma$ limiter.

By bringing a pulse-back terminal to 0 V, the ignition pulse is generated at the angle of 160° determined by the $\gamma$ limiter. This mode of operation functions to minimize the output of the thyristor circuit.

By bringing a pulse-up terminal to a plus voltage, the same state as the state in which the transistor 162 is normally "off" is established, and hence, the ignition pulse is generated at the angle of 10° determined by the $\alpha$ limiter. This mode of operation functions to maximize the output of the thyristor circuit.

By bringing a pulse-kill terminal to 0 V, the oscillation of the unijunction transistor 173 is stopped, and hence, no ignition pulse is generated.

The pulse-back, pulse-up and pulse-kill terminals mentioned above are for the special functions, and are not used in ordinary systems.

The description of the above embodiment will now be summed up.

All the circuits to the outputs of the ignition pulse control circuits 110-1 and 110-2 prefer the decrease of the field current of the generator. Accordingly, even when either of the units 70E (28-1, 28-2), the 70E interface modules 70-1 and 70-2 or the ignition pulse control circuits 110-1 and 110-2 has broken down, the output of the either side having broken down becomes the field current decrease signal.

The ignition pulse generator circuits 160-1 - 160-4 and the power units 200-1 and 200-2 are, in principle, constructed so as to prefer the increase of the field current. That is, since essentially the thyristors are ignited by advancing ignition pulses generated earlier, the generator circuits and the power units become circuits which prefer the advancing pulses and prefer the field current increasing outputs.

Owing to the dual structure based on the above combination, in a case where any abnormality has occurred inside any of the units 70E (28-1, 28-2), the 70E interface modules 70-1 and 70-2 and the ignition pulse control circuits 110-1 and 110-2, the abnormal signal in the direction of increasing the field current is canceled by the internal circuit preferring the decrease of the field current. If the abnormal signal is in the direction of decreasing the field current, it is preferred, and a field current decreasing signal is provided from either the ignition pulse control circuit 110-1 or 110-2, so that ignition pulses are about to delay. Since, however, the outputs of the ignition pulse generator circuits 160-1 - 160-2 are applied to the power units 200-1 and 200-2 in parallel, these power units are controlled by the ignition pulses of the remaining normal side. Each of the ignition pulse generator circuits includes the three pulse generators which are quite the same circuits, and granting that one of the three circuits can break down, the probability at which all the three circuits go wrong simultaneously will be almost null. Usually, the ignition pulses more often fail to develop on account of the disconnection of a resistor, the trouble of a transistor, etc. The power unit, however, is normally controlled by the normal ignition pulses on the other side (because the ignition pulses are impressed on the thyristors in parallel).

Even if one phase of the ignition pulse generator circuit has damaged so as to increase the field current, the feedback of the AVR signal corrects and controls the damage as long as the other phases are normal.

Although, in the embodiment, the field current decreasing signal is set on the plus side so as to prefer the higher voltage, the same effect is achieved even when the field current decreasing signal is set on the minus side so as to prefer a lower voltage.

In addition, although the embodiment has been described as to the example of application to the automatic voltage regulator of the generator, the invention is also applicable as the dual circuit of an excitation circuit for any other rotary electric machine (such as an electric motor or a rotary phase modifier).

The manual voltage setting unit may well be a potentiometer. Although the two power units have been mentioned, the same effect is achieved even when three or more power units are included.

As thus far described, according to this invention, field current decrease preferring circuits and field current increase preferring circuits are combined, thereby to bring forth effect that an excitation system which operates normally even in cases of the damages or abnormalities of internal components can be provided.

Dangers such a the overvoltage of a generator are prevented, and the situation of the trip (stop) of the generator can be avoided, so that a sudden shutdown does not occur. This is greatly effective in operation.

What is claimed is:

1. An excitation apparatus for controlling excitation current to a field coil of a rotary electric machine to produce a constant output from the rotary electric machine, said apparatus comprising an AVR circuit producing an AVR signal,
    two manual voltage setting units including two inductive voltage regulators providing outputs equal to each other,
    two interface module circuits including circuit means inverting the outputs of said manual voltage setting units into DC voltages and producing rectified, filtered outputs representing a manual set value for the output voltage of the generator,
    two ignition pulse control circuits, each circuit connected to receive the manual set value representing output of each interface module and further connected to receive AVR signals and including means comparing the AVR signal and the set value representing output and producing a field current decrease preferring signal responsive to the comparison therebetween,
    a plurality of sets of ignition pulse generator circuits connected to receive outputs from said ignition pulse control circuits and generate ignition pulses of six phases respectively, and
    a plurality of power units connected to provide field excitation power to the rotary electric machine including thyristors, the ignition pulses from said ignition pulse generator circuits being connected to gates of said thyristors in parallel, whereby said field excitation power units prefer increase of the field current.

2. An excitation control apparatus for a rotary electric machine as defined in claim 1, wherein said each manual voltage setting unit is a potentiometer.

* * * * *